United States Patent [19]
Armenia et al.

[11] Patent Number: 5,713,387
[45] Date of Patent: Feb. 3, 1998

[54] CONDUIT FLUID CONTAINMENT SYSTEM WITH AUTOMATIC SHUT-OFF

[76] Inventors: John G. Armenia, P.O. Box 716; Alfred L. Calciano, 3342 W. Gulf Dr., both of Sanibel Island, Fla. 33957

[21] Appl. No.: 708,534

[22] Filed: Sep. 5, 1996

[51] Int. Cl.⁶ ............... F16K 51/00; F16K 17/00; F16L 55/00
[52] U.S. Cl. ............... 137/312; 73/46; 137/67; 137/599; 137/625.47; 138/103; 138/114; 251/66; 285/13; 285/155
[58] Field of Search ............... 137/67, 312, 599, 137/599.1, 625.46, 625.47; 138/103, 104, 113, 114; 251/66; 285/13, 133.1, 155; 222/54, 108, 110; 68/207, 208

[56] References Cited

U.S. PATENT DOCUMENTS

| | | | |
|---|---|---|---|
| 1,993,666 | 3/1935 | Hornell | 137/67 |
| 2,608,205 | 8/1952 | Proctor | 137/375 |
| 2,798,503 | 7/1957 | Carver et al. | 137/67 |
| 3,512,556 | 5/1970 | McKhann | 137/71 |
| 3,802,456 | 4/1974 | Wittgenstein | 137/312 |
| 3,920,031 | 11/1975 | Maxfield | 137/312 |
| 4,341,235 | 7/1982 | Nord | 137/312 |
| 4,413,643 | 11/1983 | Wiklund | 137/68 R |
| 4,509,558 | 4/1985 | Slater | 138/104 |
| 4,779,652 | 10/1988 | Sweeney | 138/113 |
| 4,930,549 | 6/1990 | Renner | 137/312 |
| 5,156,190 | 10/1992 | Staley, Jr. | 138/104 |
| 5,190,069 | 3/1993 | Richards | 137/312 |
| 5,228,472 | 7/1993 | Ougiya et al. | 137/312 |
| 5,301,722 | 4/1994 | Todd et al. | 141/86 |

OTHER PUBLICATIONS

International Application published May, 14, 1992 under the PCT as Publication No. WO 92/07763 Title: An Apparatus and Process for Recovering Propellant and Product from Aerosols Inventors: Ling & Knott.

*Primary Examiner*—George L. Walton
*Attorney, Agent, or Firm*—C. Douglas McDonald Jr., & Associates, P.A.

[57] ABSTRACT

This invention relates to a conduit that is at least partially encased within a containment housing. The containment housing provides structure for containment of fluids from a leaking or totally failed conduit and for automatically shutting off the flow of fluid through the leaking conduit. More particularly, the apparatus comprises at least one conduit that is at least partially received within a containment housing. A valve is attached to the conduit so that it is in fluid flow relationship with the conduit. The valve is biased toward a closed position, but is held in the open position by a block located within the containment chamber defined by the space between the exterior of the conduit and the interior of the containment housing. When a predetermined fluid leaks from the conduit into the containment chamber the fluid structurally alters the block and the valve moves to the closed position blocking the flow of fluid through the conduit.

12 Claims, 4 Drawing Sheets

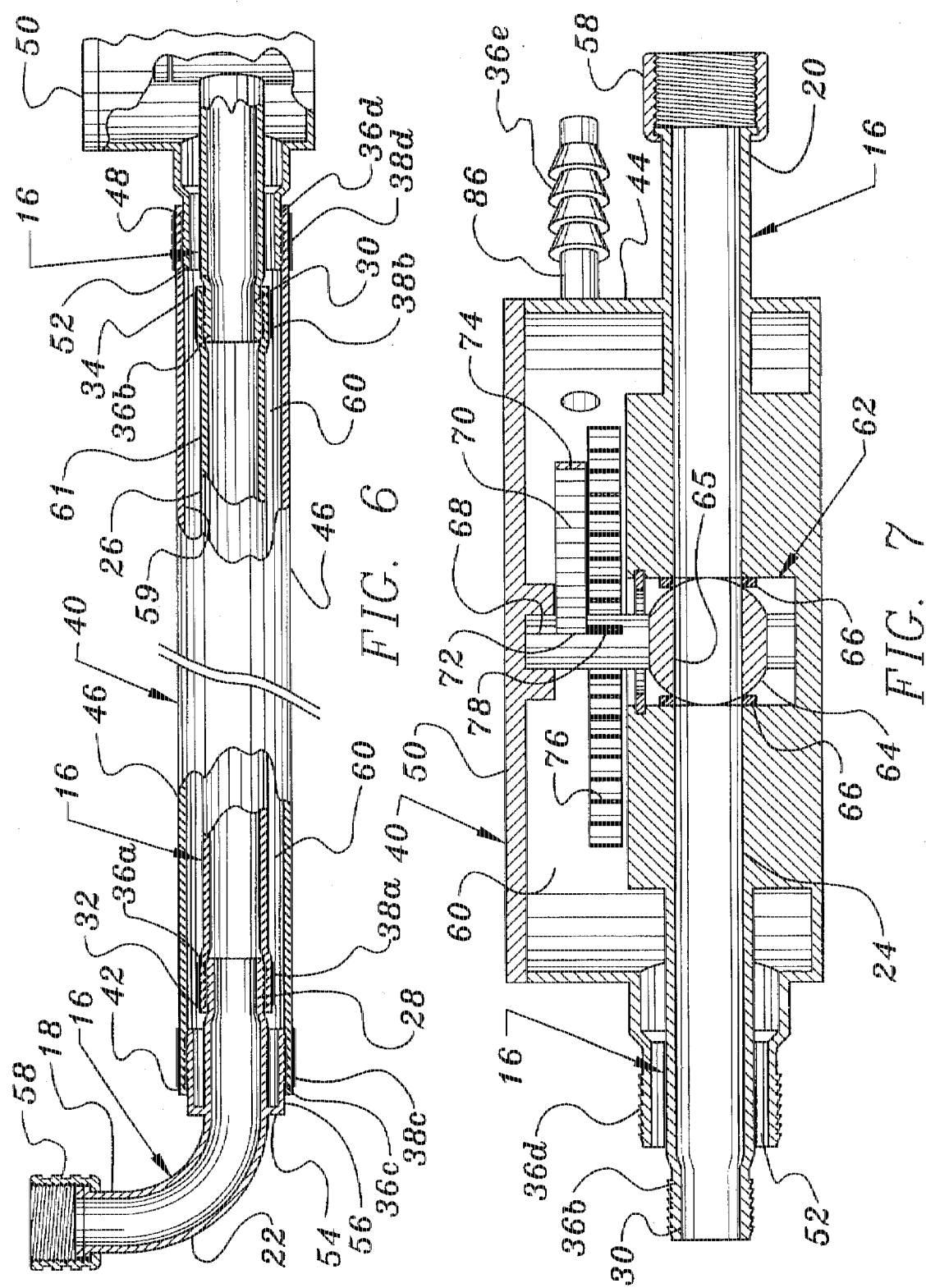

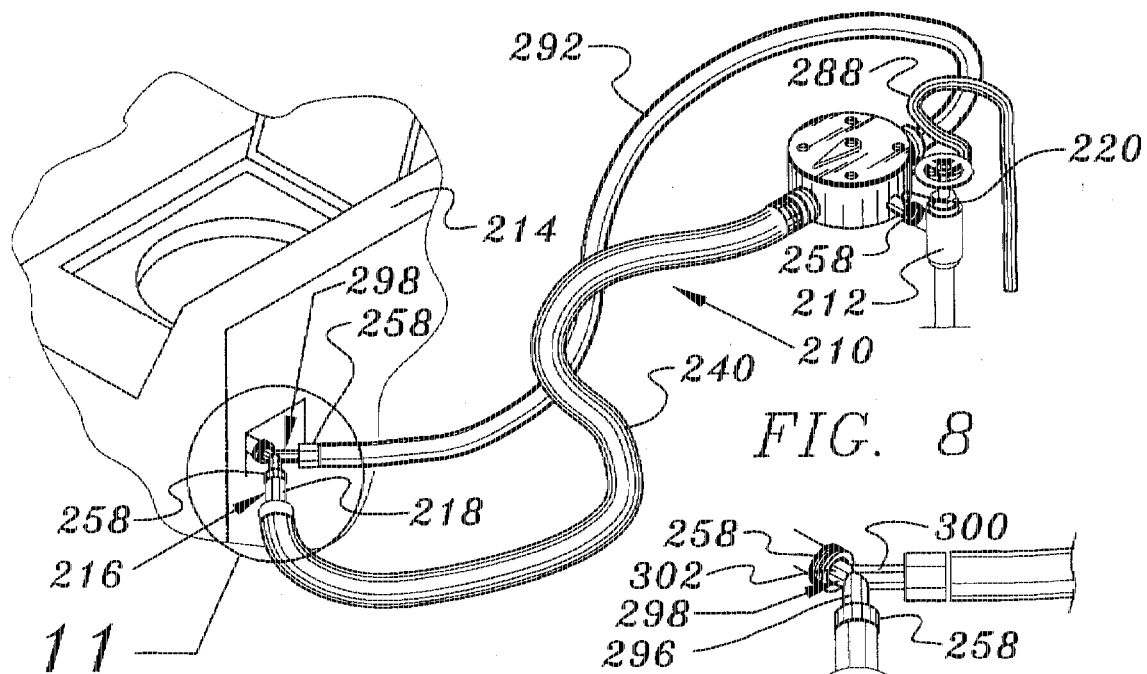
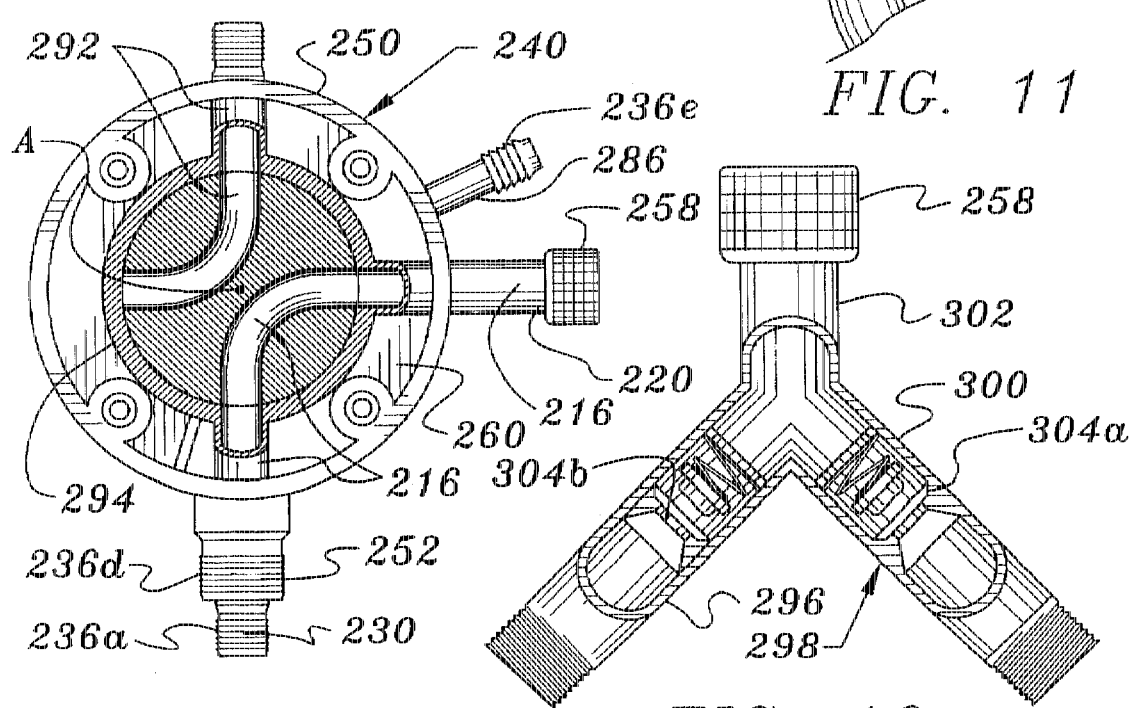

5,713,387

CONDUIT FLUID CONTAINMENT SYSTEM WITH AUTOMATIC SHUT-OFF

BACKGROUND OF THE INVENTION

1. Field of the Invention

This invention relates generally to the field of apparatus for containing fluids lost from a leaking or ruptured conduits that automatically shuts off the flow of fluid through the leaking conduit. More specifically, the present invention relates to at least one conduit, for use with various fluids, that is at least partially received within a containment housing that includes a valve that automatically shuts off the flow of fluid through the leaking conduit when fluids enter the space between the conduit and the containment housing.

2. Description of the Prior Art

It is well known that the loss of fluids from leaking pipes, hoses and other conduits create safety hazards, cause damage to the environment and cause damage to the equipment incorporating the fluid lines. Rupture or leakage from pipes or hoses that are conducting oils, hydraulic fluid and the like can cause environmental contamination of the adjacent ground or to a body of water into which the fluid may leak. The rupture of conduits carrying flammable fluids may not only contaminate the environment, but may also create a fire hazard, if the hoses leak onto hot surfaces, open flames, or close to sparks. Fluid lines connecting home appliances to water sources are normally left under pressure. Rupture of these pressurized water lines permits large quantities of water to flood the homes, causing extensive damage to the homes and the contents thereof.

One example of a hydraulic safety hose is disclosed by U.S. Pat. No. 5,156,190 that was issued to Colin R. Staley, JR. The apparatus disclosed comprises a pipe tee that mounts over the hydraulic hose and is connected to an outer sheath that encloses the hose. Any leakage from the hydraulic hose into the space between the hose and the sheath is collected by the tee which is attached to a drain. Within the tee is an electrically operated valve that is attached to a fluid sensor that closes the valve upon sensing fluids between the jacket and the hydraulic hose.

Another example is U.S. Pat. No. 5,190,069, which was issued to Raymond Richards. This patent discloses a fluid sensing tape that is wrapped about a pipe. The tape is electrically connected to a controller that is connected to a valve inserted within the pipe. Fluids that leak from the pipe will have a tendency to be collected by the tape which signals the controller to close the valve cutting off the flow of fluid through the leaking pipe.

U.S. Pat. Nos. 2,608,205, 4,413,643 and 3,512,556 issued to Ralph Proctor, Thore Wiklund and Serge McKhann, respectively, disclose double walled hoses having the space between the outer hose and the inner hose pressurized with other fluids so that a breakage in the outer hose will close a valve that shuts off the flow of fluid through the inner hose.

Many of these patents are concerned about a breach in the exterior hose caused by exterior sources, such as digging into buried lines. These patents do not address the failure of the central hose due to fatigue from long term pressurization. Pressurizing the exterior hose creates the same rate of fatigue as the inner hose with the same risk of failure due to that fatigue. All the systems are complex, requiring a supply of electricity and/or pressurization equipment for pressurizing the space between the inner hose and the outer hose. It is obvious that there is a need for a simple, cost effective conduit fluid containment system to collect fluids leaking from the conduit upon its failure that also automatically cuts off the flow of fluid through the conduit to prevent fluid loss and to prevent the damage that the fluid does to the surrounding area.

SUMMARY OF THE INVENTION

To overcome the disadvantages of the prior art, it is an object of the present invention to provide an apparatus, for conducting fluids from a fluid source to a fluid receiver, that will control the fluid being leaked and reduce the loss of fluid by cutting off its flow proximal the source. The apparatus should be inexpensive and reliable without complex parts or the requirement for electrical circuitry or structure for providing pressurization.

To achieve the forgoing and other objects that will become apparent to those skilled in the art, this invention provides apparatus for collecting fluids that are leaking from a conduit and shutting off the fluid flow through that conduit shortly after leakage commences. The apparatus of this invention comprises at least one conduit having an inlet end and an outlet end and at least one containment housing that receives at least a portion of the conduit therein forming a space between the inner surface of the containment housing and the outer surface of the conduit defined as a containment chamber. A valve is attached in fluid flow relationship to the conduit. An arm is attached to the valve and is movable from an open position, defined as when a fluid is able to pass through the valve, to a closed position, defined as when fluid is unable to flow through the valve. A means for biasing the valve to the closed position is attached to the valve and engages the containment housing. An air vent is formed in the containment housing so that when fluid leaks into the containment chamber the fluid may displace the air therein. A block engages the arm and the housing holding the valve in the open position. When a predetermined fluid enters the containment chamber the fluid structurally alters the block releasing the arm so that the biasing means moves the valve to the closed position shutting off the fluid flow through the valve.

BRIEF DESCRIPTION OF THE DRAWINGS

FIG. 6 is a cross-sectional detailed front elevational view of a portion of the invention of FIG. 1;

FIG. 7 is a cross-sectional view taken along line 7—7 of FIG. 4;

FIG. 8 is a perspective view of a second embodiment of the invention, showing its attachment to a fluid source, a fluid receiver and to a drain, which are shown in phantom;

FIG. 9 is a detailed cross sectional view of a portion of the invention of FIG. 8 illustrating the valve;

FIG. 10 is a detailed top plan view of the Y connector of the invention of FIG. 8 with portions broken away.

FIG. 11 is a detailed view of the y connector of FIG. 10 illustrating its connection to the fluid receiver, as shown in FIG. 8.

Similar reference characters refer to similar parts throughout the several views of the drawings.

DESCRIPTION OF A PREFERRED EMBODIMENT

One embodiment of the apparatus of this invention is illustrated in FIGS. 1–7 and a second embodiment is illustrated in FIGS. 8–10, and because of the general similarity of certain portions of each of these embodiments with the corresponding portions of the other, the embodiment of FIGS. 1–7 will be described in detail below and the second embodiment of the apparatus will be described with reference to the differences between the two embodiments. The first embodiment will be indicated generally as 10, in FIGS. 1–7, while the second embodiment will be indicated generally as 210 in FIGS. 8–10. Those elements of the second embodiment that are the same as the elements in the first embodiment will be identified by the same reference numbers increased by the number 200.

Figure 1:
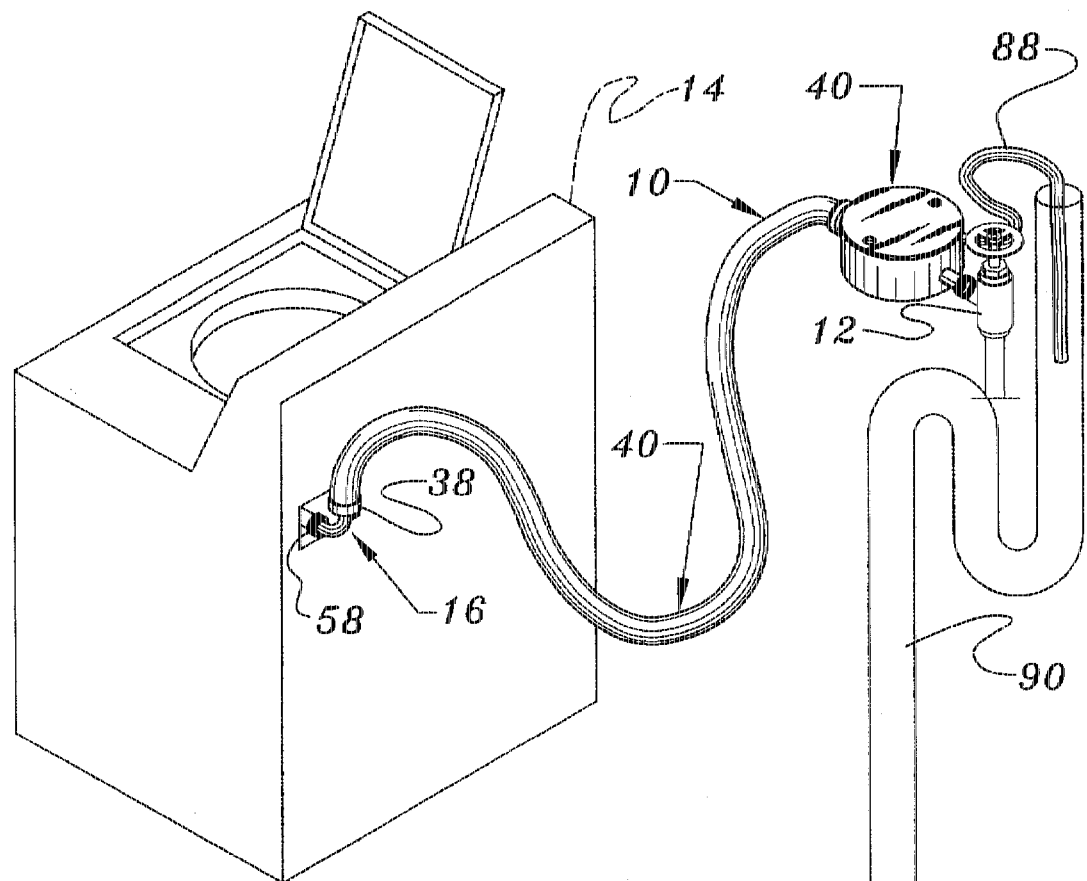
FIG. 1 is a perspective view of one embodiment of the apparatus of this invention, showing its attachment to a fluid source, a fluid receiver and to a drain, which are shown in phantom.

As seen in FIG. 1, the apparatus 10 is illustrated as being connected to a fluid source, conveniently water spigot 12, and a fluid receiver 14, conveniently a washing machine 14. The particular use of the invention as a water supply hose for a washing machine is for illustrative purposes only, as the invention 10 may be used for many different purposes, including but not limited to water supply lines to other appliances, water, gas or oil lines in marine equipment that are not readily accessible, equipment hydraulic lines, and fluid lines in manufacturing plants for transfer of toxic and/or corrosive fluids. The invention is particularly appropriate where the escape of fluid would create substantial damage and automatic shut off of the fluid flow would be of value.

For clarity, the apparatus 10, as illustrated in FIGS. 1–7, illustrates a single water supply hose, but it is well known that two separate hoses are required to separately supply hot and cold water to washing machines. As can be seen in FIGS. 6 and 7 the apparatus 10 comprises at least one conduit, shown generally as 16, that has an outlet end 18 and an inlet end 20. The conduit 16 further comprises a first section 22 that includes the outlet end 18, a third section 24 that includes the inlet end 20 and a second section 26 that is interposed between and connected in fluid flow relationship with the first section 22 and the third section 24. In the preferred embodiment illustrated, the first section 22 is comprised of a rigid synthetic resin; however, it may be made from metal, such as steel or aluminum, or any other well known material suitable for the purpose. The third section 24 is also comprised of a rigid material that may be the same material from which the first section 22 is constructed. The second section 26 in the embodiment illustrated is comprised of a standard flexible rubber water hose that is typically used to attach appliances to water sources. Certainly other materials may be used with satisfactory results as water hoses are also made from plastic and rubber, and plastic and rubber hoses may be reinforced with nylon fiber or steel mesh. It must be understood that the materials used for washing machine hoses, the illustrated usage of the invention 10, may not be suitable for other usages of the apparatus 10. The fluid being transported in the conduit 16 will dictate the particular materials from which the apparatus is made, and those skilled in the art will be able to select the appropriate materials. For example, if acid or other caustic materials were being transported, the conduit 16 would necessarily be made from materials resistant to the corrosive effects of those fluids.

As best seen in FIG. 6 and FIG. 7, the first section 22 has a second end 28 and the third section 24 has a first end 30. The second section 26 has a first end 32 and a second end 34. On the second end 28 of the first section 22 and on the first end 30 of the third section 24 are formed concentric projections 36a and 36b, respectively, that are similar to threads but with sharper edges on the lands, conveniently barbs 36. The water tight connection between the first section 22 and the second section 26 is made by forcing the first end 32 of the flexible hose 26 over the barbed portion of the second end 28 of the first section 22 to create a friction fit. To ensure that the joint remains tight a crimped band 38a is wrapped tightly about the joint. A water tight connection is made about the second end 34 of the second section 26 with the first end 30 of the third section 24 in the same manner. The sections 22, 24 and 26 may be joined to one another by using threaded couplings or any other method known by those skilled in the art that is suitable for the purpose.

The invention 10 further comprises a containment housing 40 that has a first end 42 and a second end 44. The containment housing 40 further comprises a first part 46, which includes the first end 42 and has a second end 48, and a second part 50, which includes the second end 44 and has a first end 52. The first end 42 of the containment housing 40 is attached to an L shaped leg 54 that is formed contiguous with the first section 22 of the conduit 16. The leg 54 due to its L shape is spaced apart from the first section 22 and has a plurality of barbs 36c formed on the outwardly facing side 56. The first part 46 of the containment housing 40 is comprised of a flexible hose that in a preferred embodiment is made from woven polyester. In other embodiments, the flexible hose of the first part 46 may include a urethane inner lining. Other flexible hose material, including but not limited to elastomeric materials (including polyvinyl), rubber and other well known materials, are also suitable for the purpose. Being flexible, the first end 42 of the first part 46 of the containment housing 40 is forced over the barbs 36c on the leg 56 to provide a watertight friction fit. Again, to ensure that the connection remains tight a crimped band 38c is tightly bound about the first end 42 of the first part 46. The second part 50 of the containment housing 40 is comprised of a rigid material that may be a generally rigid synthetic resin or may be made from metal, including but not limited to steel and aluminum. Barbs 36d are formed on the first end 52 of the second part 50 so that the second end 48 of the first part 46 may be forced over the barbs 36d to form a watertight friction fit that is retained by a crimped band 38d.

The outlet end 18 of the fluid conduit 16 has a standard female coupling 58 attached thereto for attachment to an appliance such as the washing machine 14 shown in FIG. 1. The inlet end 20 of the conduit 16 also has a threaded female coupling 58 attached thereto so that the inlet end 20 of the conduit 16 may be attached to a water spigot 12 as shown in FIG. 1.

The interior surface 59 of the containment housing 40 is spaced apart from the exterior surface 61 of the conduit 16 to create a containment chamber 60 therebetween. The containment chamber 60 of the second part 50 of the containment housing 40 is enlarged to accommodate a valve 62, a portion of which in a preferred embodiment illustrated in FIG. 7 is formed contiguously with the second part 50 of the containment housing 40 and the third section 24 of the conduit 16. The valve 62, in a preferred embodiment, is a ball valve having a ball 64 with a bore 65 therethrough. The ball 64 is inserted between two portions of the third section 24 of the conduit 16. The ends of these portions each have a bell shaped end 66 that forms a water tight seal with the ball 64 of the ball valve 62. A valve stem 68 is attached to the ball 64 and extends away from and generally normal to the conduit 16 and engages the interior surface 59 of the second part 50 of the containment housing 40. While in a preferred embodiment, the valve 62 is a ball valve, in other embodiments the valve 62 may be a butterfly valve, gate valve (including a sliding gate), a globe valve or any other well known valve suitable for the purpose.

Figure 4:
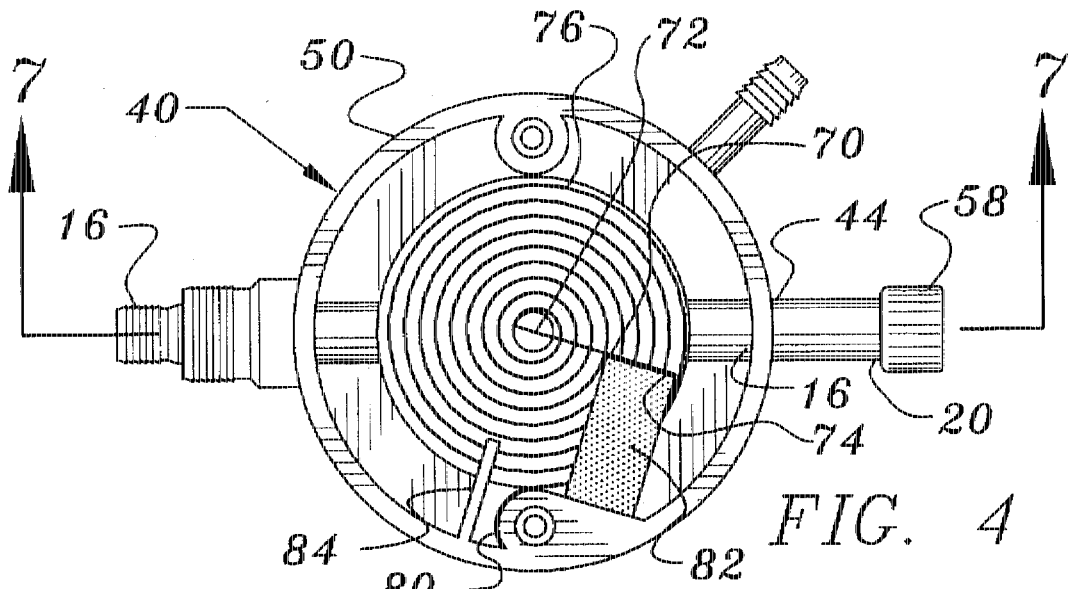
FIG. 4 is the view of FIG. 3 with the cover plate removed to illustrate the valve arm in the open position.
Figure 5:
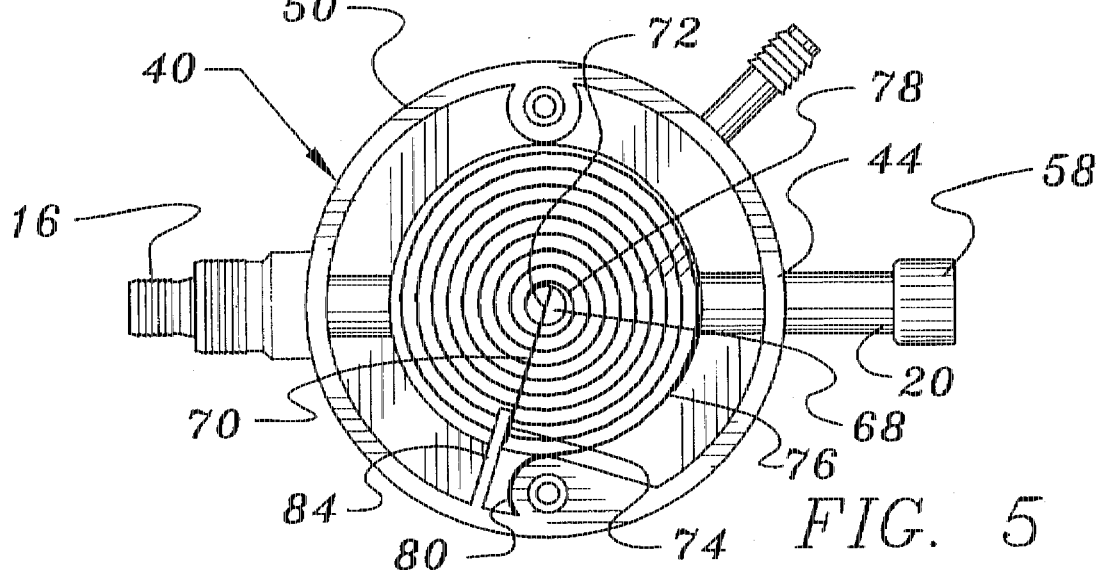
FIG. 5 is the view of FIG. 4 illustrating the valve arm in the closed position.

The first end 72 of an arm 70 is attached to the valve stem 68 and the second end 74 of the arm 70 extends away from and is generally normal to the valve stem 68. A biasing means, conveniently spring 76 is mounted adjacent to the valve 62 so that one end of the spring 78 is attached to the valve stem 68 and the other end 80 engages the second part 50 of the containment housing 40. In the embodiment disclosed in FIGS. 4–7 the spring is a spiral wound clock type spring; however, any standard type of spring or spring type material may be successfully used to bias the arm 70 to the closed position of the valve 62 which is defined as that position when fluid entering the inlet end 20 of the conduit 16 is unable to flow through the valve and is prevented from entering the second section 26 and the first section 22 and therefore from exiting the outlet end 18 of the conduit 16. By pivoting the arm from open position as shown in FIG. 4 through approximately 90 degrees of rotation the valve 62 will be moved to the closed position as shown in FIG. 5.

A block 82 engages a portion of the valve 62, specifically the arm 70, and engages the containment housing 40 preventing the arm from pivoting in the clockwise direction, the direction by which the arm 70 is biased by the spring 76. The block 82 engages an area of the interior surface 59 of the containment housing 40 that forms a seat to hold the block 82 firmly between the arm 72 and the containment housing 40.

The choice of materials from which the block 82 is constructed depends upon the fluid that is being transported through the apparatus 10. When the fluid being transported leaks into the containment chamber 60 and immerses the block 82, the material must be sufficiently structurally altered upon immersion in the fluid so that the arm 70 may pivot, closing the valve 62. In the embodiment in which the apparatus 10 is used to transport water to appliances, the material must be alterable by water. In a preferred embodiment, the block 82 is comprised of pulverized acrylic particles that are bonded to one another by a water soluble adhesive, for example, National Starch & Chemical Co. adhesive #13-1200, a borated dextrin. Other water soluble adhesives that are well known in the art, may be used to bind other fractured material, material that is comprised of separable parts, such as sand or any other material that is fractured or broken into small enough parts so that the arm 70 is clear to pivot after the binding adhesive has been removed by the water.

The block 82 may also be made from a material that is generally soluble in water, including but not limited to, salt, sugar, or starch and gypsum based materials. When the block 82 dissolves in the water the arm 70 is free to pivot.

In other embodiments the block 82 may be made form materials that deform or become deformable upon immersion in water. For example, sponges (natural or synthetic) and materials treated with soluble stiffening agents, such as fabric treated with starch or gypsum base materials, that form a hard block when the material is generally dry and softens when immersed in water. Cardboard, and other materials known in the art, also soften and deform when wet and placed under pressure by a biasing means, spring 76, and the arm 70. Due to the residue of material left after deformation, the size of the block 82 must be sufficient to allow adequate deformation so that the arm 70 pivots far enough to move the valve 62 to the closed position.

The block 82 may be solid, perforated with one or more holes and constructed in any suitable shape to hold the arm 70 in the open position. A gel coat, similar to the coatings applied to aspirin, and well known in the art, may be applied to the block 82 to reduce the effect of high humidity being present within the invention 10.

When a fluid other than water, including but not limited to, oil or hydraulic fluid, is being transported through the apparatus 10, different materials may have to be used. Some of those materials previously mentioned as alterable by water may also be sufficiently alterable in oil or hydraulic fluid. In a preferred embodiment, a block 82 formed from certain plastics, for example expanded polystyrene, which would be dissolved by aromatic hydrocarbons, and cellulose acetate-butyrate, which would be softened and deformable, will be dissolved or deformed by aromatic hydrocarbons and allow the arm 70 to pivot, closing the valve 62. There are many other materials including certain light rubbers that are altered by immersion in petroleum or other aromatic hydrocarbons that are well known in the art and may be used to form the block 82.

A stop 84 extends radially inwardly from the interior surface of the second part 50 of the containment housing 40. When the arm 70 is released, the stop 84 engages the arm 70, to prevent the arm 70 from rotating beyond 90 degrees, beyond the closed position.

Figure 2:
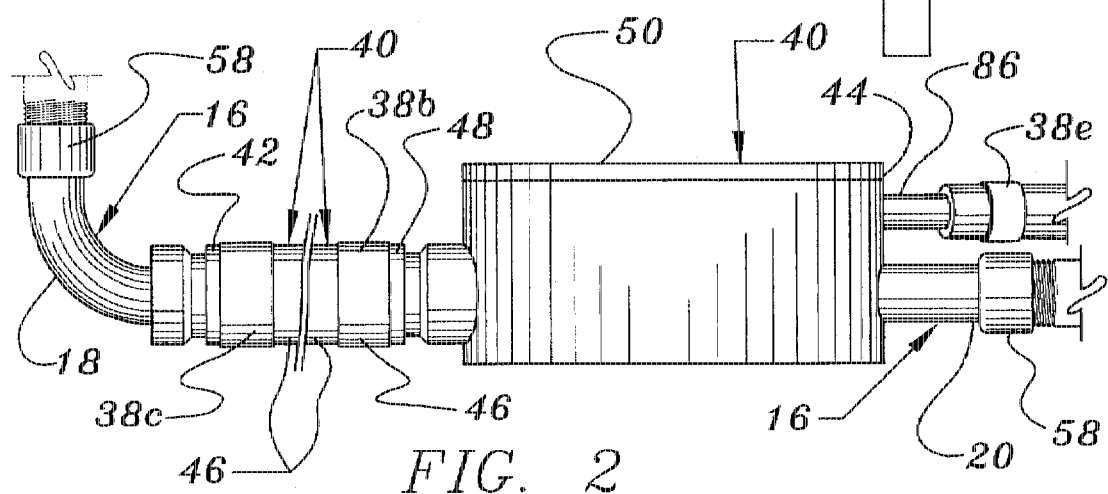
FIG. 2 is a side elevational view of the invention of figure one with portions broken away for convenience.
Figure 3:
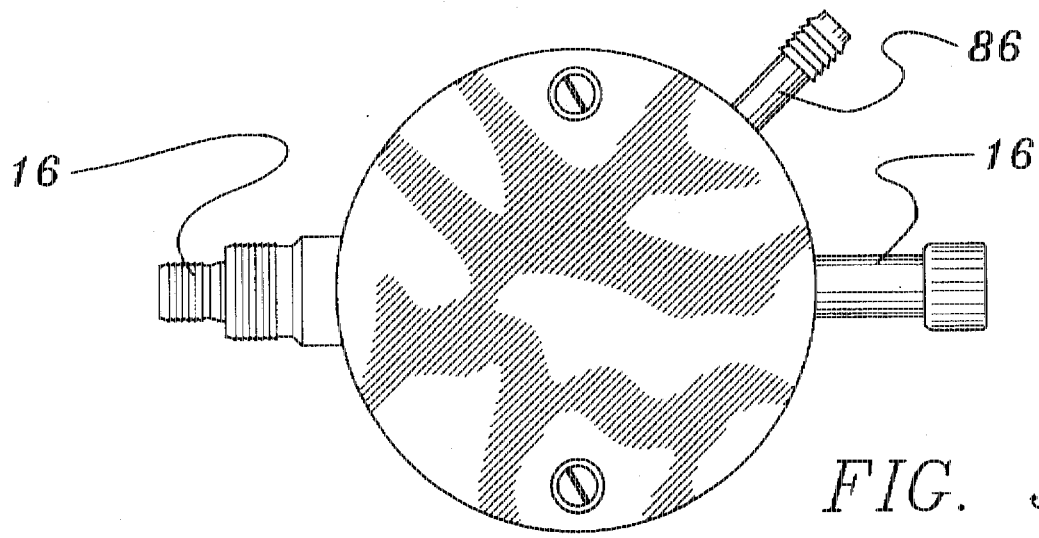
FIG. 3 is a detailed plan view of a portion of the invention of FIG. 2.

A vent tube 86 is attached to the apparatus 10 proximal to the second end 44 of the second part 50 of the containment housing 40 so that the tube 86 is in fluid flow relationship with the containment chamber 60. A flexible hose 88 is sized and configured so that one end may be inserted over the free end of the vent tube 86 on which barbs 36e have been formed to engage the interior of the vent hose 88. To ensure a tight fit a crimped band 38e as shown in FIG. 2 may be bound around the vent hose 88 proximal the barbs 36e. The free end of the vent hose 88 is sized and configured to be received by a drain pipe 90, that is shown in phantom in FIG. 1.

The second embodiment, disclosed in FIGS. 8–10, has many of the same elements as the first embodiment 10 shown in drawing FIGS. 1–7. The conduit (enclosed by the containment housing, but not shown) and the containment housing 240 are made in the same manner as the conduit 16 and the containment housing 40 previously disclosed. A major difference in the second embodiment 210 is the addition of a bypass conduit 292 that is comprised of a single walled hose. In other embodiments, the bypass hose 292 could be a double walled hose with the containment chamber connected in fluid flow relationship with the second part 250 of the containment housing 240. A standard two-way valve 294 is substituted for the ball valve 62 shown in FIG. 7; however, the remaining structure of the means for closing the valve remains the same. The bypass conduit 292 is connected to the valve 294 so that when the valve 294 is open in relation to the conduit 216, the valve 294 is closed in relation to the bypass conduit 292, as seen in FIG. 9. When the valve 294 is closed in relation to the conduit 216, the valve 294 is open in relation to the bypass conduit 292 so that fluid continues to flow, but now through the bypass conduit 292. The female coupling 258 on the outlet end 218 of conduit 216 is connected to the second inlet branch 296 of a Y-shaped coupling 298 and the female connector 258 of the bypass conduit 292 is attached to the first inlet branch 300 of the connector 298. The outlet branch 302 is then connected to the fluid receiver, conveniently washing machine 214. Therefore, when a leak occurs in the conduit 216, the valve transfers the fluid flow to the bypass conduit 292 with little interruption of the fluid flow.

As mentioned previously, the structure for rotating the valve 294 from the open position to the closed position remains the same as the structure (valve stem 68, arm 70 spring 76, block 82 and stop 80) adjacent to the valve 62 as shown in FIGS. 4, 5, and 7. The second embodiment Comprises the same valve stem, arm, spring, block and stop (all not shown) that are attached to valve 294 in the same manner disclosed in the previous discussion and shown in the drawings. The valve stem is attached to the valve 294 so that the valve stem extends along the axis A of the valve 294 as shown in FIG. 9. Upon failure of conduit 216, the fluid will flow through the hole in conduit 216, enter the comment chamber 260, dissolve the fluid soluble block (not shown) releasing the arm (not shown) so that the arm (not shown) rotates the valve stem (not shown) that rotates valve 292 about axis A, approximately 90 degrees. Upon a 90 degree rotation of the valve 294, the portion of the conduit 216 formed in the valve 294 is rotated away from and disconnected from the inlet end 220 of the conduit 216 and the portion of the bypass conduit 292 that is formed in the valve 294 is rotated so that portion is in fluid flow relation with the inlet end 220 of conduit 216 and the bypass conduit 292.

A first and second standard backflow preventer 304a and 304b respectively, have been inserted into the first and second inlet branches, 300 and 296 respectively, of the connector 298. Such backflow preventers are well known in the art and their structure will not be discussed herein. The first backflow preventer 304a prevents prevent the bypass conduit 292 from being charged with fluid when the apparatus 210 is under normal operation. When a leak occurs the second backflow preventer 304b prevents the fluid from entering the conduit 216 and leaking into the containment chamber 260 through the failed area in the conduit 216. Ball valves may be inserted in place of the backflow preventers, but they would prevent the automatic transfer of fluid flow through the bypass conduit upon failure of the conduit 216.

Now that the apparatus has been described, the method of operation of a preferred embodiment the present invention will be described as it relates to providing water to a washing machine as shown in FIG. 1. The female coupling 58 that is attached to the inlet end 20 of the conduit 16 of apparatus 10 is connected to a water spigot 12. The female coupling 58 attached to the outlet end 18 of the apparatus 10 is then attached to the appropriate hot water or cold water pipes of the washing machine 14. With the couplings 58 tightly fastened the water spigot 12 is turned to the on position permitting the water to flow through the conduit 16. For ease of handling and cost concerns, the second section 26 of the conduit 16 is comprised of rubber, which is the standard for the washing machine hose industry. When a leak occurs, water will enter the containment chamber 60 filling the chamber until the water exits through the vent hose 88. The vent tube 86 prevents air from being trapped in the apparatus 10 that might interfere with the immersion of the soluble block in the fluid. Upon being immersed in the water, the water soluble block 82 rapidly dissolves. Once the soluble block 82 has been dissolved, the arm 74 rotates in a clockwise direction until it engages the stop 84. The rotation of the arm 70, the valve stem 68 and the ball 64 causes the bore 65 to rotate 90 degrees closing the valve and preventing any flow of water through the conduit 16. The open end of the hose 88 may be inserted into a drain 90 so that the water flows down the drain doing no damage.

In the second preferred embodiment disclosed in FIGS. 8, 9 and 10 the apparatus 210 is again shown being used with a washing machine 14 as a matter of convenience. The use of a bypass hose is important in those areas in which failure of the primary hose or conduit 16 would cause shutdown in the operation of an important system. By continuation of the flow through the bypass conduit 292 the apparatus receiving the fluid may remain in operation. In the embodiment shown in the drawings, the apparatus 210 is attached to the water spigot 212 by the female coupling 258 that is attached to the first end 220 of the conduit 216. The female coupling 258 that is attached to the connector 298 is attached to the appropriate hot water or cold water input pipe of the washing machine 214. The water spigot 212 may then be opened so that water flows through the valve 294 and through the conduit 216. Upon failure of the conduit 216 water again collects within the containment chamber 260 until the soluble block is emersed and dissolves. On dissolving the block 82, the spring (not shown) rotates the valve stem (not shown) 90 degrees. The valve 294 is now aligned so that fluid may enter the inlet end 220 and pass through the bypass conduit 292, through the second inlet branch 300 and into the washing machine 214. Water is prevented from backing up through the second inlet branch 296 and into the conduit 216 by the back flow preventer 304b that is inserted within that branch. Excess water that has collected within the containment chamber 260 will flow out through the vent 286 until the valve is rotated, therefore a hose 288 connects the vent 286 with a drain for appropriate disposal of the excess fluid.

While the foregoing description is directed to particularly preferred embodiments of the present invention, it is to be understood that those embodiments are representative only of the principles of the invention and are not to be considered limitative thereof. Because numerous variations and modifications of the apparatus, all within the scope of the present invention, will become apparent to those skilled in the art, the scope of the invention is to be limited solely by the claims appended hereto.

What is claimed:

1. Apparatus for conducting fluids from a fluid source to a fluid receiver and for controlling fluid loss therefrom, said apparatus comprising:

at least one conduit having an outer surface, an inlet end and an outlet end;

at least one containment housing having an inner surface, a first end and a second end, said containment housing being sized and configured to receive at least a portion of said conduit therein, such that a containment chamber is defined between said outer surface of said conduit and said inner surface of said containment housing;

a valve attached in fluid flow relationship to said conduit;

an arm having a first end attached to said valve for movement of said valve from an open position, defined as when a fluid is able to pass through said valve, to a closed position, defined as when a fluid is unable to flow through said valve;

means for biasing said valve to said closed position being attached to said valve;

an air vent formed in said containment housing such that when a fluid enters said containment chamber at least a portion of the air is vented from said containment chamber; and a block, having a first end and a second end, said block inserted within said containment chamber such that said first end of said block engages and holds said arm in said open position and said second end of said block being connected to said containment housing, said block being structurally alterable by a fluid whereby when said fluid enters said containment chamber through a breach in said conduit, said fluid at least partially immerses said block so that said block is structurally altered releasing said arm, so that said valve is moved to said closed position by said biasing means.

2. Apparatus as in claim 1 wherein said block is comprised of fluid soluble material.

3. Apparatus as in claim 1 wherein said block is comprised of fractured material whose parts are bound to one another by a fluid soluble adhesive.

4. Apparatus as in claim 1 wherein said block is comprised of material that is deformable when immersed in a predetermined fluid.

5. Apparatus as in claim 1 further comprising a valve stem attached to said valve such that rotation of said valve stem moves said valve from said open position to said closed position, said biasing means urging said valve stem to said closed position; said first end of said arm being attached to said valve stem and said arm having a second end extending therefrom; and said block engaging said second end of said arm so that said arm and said valve stem are prevented from pivoting, whereby said valve is held in said open position.

6. Apparatus as in claim 1, said conduit comprising: a first section, that includes said outlet end, said first section being comprised of a rigid material; a third section, that includes said inlet end, said third section being comprised of a rigid material, and a second section interposed between and connected in fluid flow relationship with said first and third sections, said second section being comprised of a flexible material; and said containment housing comprising a first part, including said first end, said first part being comprised of a flexible material and a second part, including said second end, said second part being comprised of a rigid material, said first and second parts being attached to one another in fluid flow communication; and said valve being inserted in said third section of said conduit and attached to said second part of said housing.

7. Apparatus as in claim 6, said apparatus further comprising said third segment of said conduit being contiguously formed with said second part of said containment housing.

8. Apparatus as in claim 1 further comprising a drain line having a first end attached to said vent and a second end connectable to a drain pipe, whereby the fluid overflowing said containment chamber through said vent is captured by said drain pipe.

9. Apparatus as in claim 1, further comprising;

a bypass conduit having a first end and a second end, said first end being attached to said valve and extending outwardly therefrom, said bypass conduit passing through and being sealed to said containment housing, when said valve is in said open position in relation to said conduit, said valve is closed in relation to said bypass conduit such that no fluid may pass through said valve into said bypass conduit, when said valve is closed in relation to said conduit said conduit is in fluid flow relationship with said valve and thereby in fluid flow relationship with said inlet end of said conduit.

10. Apparatus as in claim 9, further comprising a Y-shaped connector having a first inlet branch, a second inlet branch, and an outlet branch, said first inlet branch being attached in fluid flow relationship with said outlet end of said bypass conduit, said second inlet branch being attached in fluid flow relationship with said second end of said conduit and said outlet branch of said connector having an outlet end, said outlet end of said outlet branch being connectable to a fluid receiver.

11. Apparatus as in claim 10, further comprising a first backflow preventer being attached to said connector within said first outlet branch of said connector, such that fluid flowing in said conduit is prevented from entering said bypass conduit from said Y-shaped coupling.

12. Apparatus as in claim 10, further comprising a second backflow preventer being attached to said connector within said second outlet branch of said connector, such that fluid flowing in said bypass conduit is prevented from entering said conduit from said Y-shaped coupling.

* * * * *